(12) United States Patent
Stewart et al.

(10) Patent No.: US 8,471,521 B2
(45) Date of Patent: Jun. 25, 2013

(54) ELECTRIC VEHICLE EXTENDED RANGE HYBRID BATTERY PACK SYSTEM

(75) Inventors: Sarah G. Stewart, San Francisco, CA (US); Scott Ira Kohn, Redwood City, CA (US); Kurt Russell Kelty, Palo Alto, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 398 days.

(21) Appl. No.: 12/962,693

(22) Filed: Dec. 8, 2010

(65) Prior Publication Data

US 2012/0038314 A1   Feb. 16, 2012

Related U.S. Application Data

(60) Provisional application No. 61/372,351, filed on Aug. 10, 2010.

(51) Int. Cl.
*H02J 7/14* (2006.01)
*G06F 7/00* (2006.01)
*B60W 10/24* (2006.01)

(52) U.S. Cl.
USPC ........... 320/104; 320/132; 701/63; 180/65.29

(58) Field of Classification Search
USPC .............. 320/103, 104, 132; 180/65.1, 65.21, 180/65.29, 65.31; 903/903, 907; 701/22, 701/63
See application file for complete search history.

(56) References Cited

U.S. PATENT DOCUMENTS

| | | | |
|---|---|---|---|
| 5,898,282 A | 4/1999 | Drozdz et al. | |
| 5,905,360 A | 5/1999 | Ukita | |
| 6,687,581 B2 | 2/2004 | Deguchi et al. | |
| 6,793,027 B1 | 9/2004 | Yamada et al. | |
| 7,349,797 B2 | 3/2008 | Donnelly et al. | |
| 7,532,960 B2 | 5/2009 | Kumar | |
| 7,834,583 B2 * | 11/2010 | Elder et al. | 320/104 |
| 7,859,202 B2 * | 12/2010 | Lukic et al. | 318/139 |
| 7,933,695 B2 | 4/2011 | Yamaguchi | |
| 8,180,512 B2 | 5/2012 | Kelty et al. | |
| 8,190,320 B2 | 5/2012 | Kelty et al. | |
| 2003/0106726 A1 | 6/2003 | Yoshii | |
| 2005/0052080 A1 | 3/2005 | Maslov et al. | |
| 2008/0027639 A1 | 1/2008 | Tryon | |
| 2008/0245587 A1 | 10/2008 | Sastry et al. | |
| 2009/0322503 A1 | 12/2009 | Suzuki et al. | |
| 2010/0138142 A1 | 6/2010 | Pease | |
| 2010/0174484 A1 | 7/2010 | Sivasubramaniam et al. | |

OTHER PUBLICATIONS

Boyd, Steven J. "Hybrid electric vehicle control strategy based on power loss calculations." Virginia Polytechnic Institute and State University (2006).

* cited by examiner

*Primary Examiner* — Richard V Muralidar
(74) *Attorney, Agent, or Firm* — Patent Law Office of David G. Beck

(57) ABSTRACT

A power source comprised of a first battery pack (e.g., a non-metal-air battery pack) and a second battery pack (e.g., a metal-air battery pack) is provided, wherein the second battery pack is only used as required by the state-of-charge (SOC) of the first battery pack or as a result of the user selecting an extended range mode of operation. Minimizing use of the second battery pack prevents it from undergoing unnecessary, and potentially lifetime limiting, charge cycles. The second battery pack may be used to charge the first battery pack or used in combination with the first battery pack to supply operational power to the electric vehicle.

10 Claims, 6 Drawing Sheets

ELECTRIC VEHICLE EXTENDED RANGE HYBRID BATTERY PACK SYSTEM

CROSS-REFERENCE TO RELATED APPLICATION

This application claims benefit of the filing date of U.S. Provisional Patent Application Ser. No. 61/372,351, filed Aug. 10, 2010, the disclosure of which is incorporated herein by reference for any and all purposes.

FIELD OF THE INVENTION

The present invention relates generally to batteries and, more particularly, to means for optimizing the power source of an electric vehicle that utilizes battery packs of differing types.

BACKGROUND OF THE INVENTION

A metal-air cell is a type of battery that utilizes the same energy storage principles as a more conventional cell such as a lithium ion, nickel metal hydride, nickel cadmium, or other cell type. Unlike such conventional cells, however, a metal-air cell utilizes oxygen as one of the electrodes, typically passing the oxygen through a porous metal electrode. The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Due to the use of oxygen as one of the reactants, metal-air cells have some rather unique properties. For example, since the oxygen does not need to be packaged within the cell, a metal-air cell typically exhibits a much higher capacity-to-volume, or capacity-to-weight, ratio than other cell types making them an ideal candidate for weight sensitive applications or those requiring high energy densities.

While metal-air cells offer a number of advantages over a conventional rechargeable battery, most notably their extremely high energy density, such cells also have a number of drawbacks. For example, care must be taken to avoid the undesired evaporation of electrolyte, especially in high temperature, low humidity environments. It is also necessary to ensure that there is a sufficient supply of air to the cells during discharge cycles, and means for handling the oxygen emitted from the cells during the charge cycles. Another potential disadvantage of a metal-air cell is the power available on discharge. Due to the kinetics of the electrode reactions, the maximum discharge rate is far lower than that of many other types of cells, such as lithium-ion cells.

Accordingly, while metal-air cells offer some intriguing benefits, such as their high energy densities, their shortcomings must be taken into account in order to successfully integrate the cells into a system. The present invention provides such a system by combining a metal-air battery pack with a conventional battery pack in order to gain the benefits associated with each battery type.

SUMMARY OF THE INVENTION

The present invention provides a power source comprised of a first battery pack (e.g., a non-metal-air battery pack) and a second battery pack (e.g., a metal-air battery pack), wherein the second battery pack is only used as required by the state-of-charge (SOC) of the first battery pack or as a result of the user selecting an extended range mode of operation. Minimizing use of the second battery pack prevents it from undergoing unnecessary, and potentially lifetime limiting, charge cycles. The second battery pack may be used to charge the first battery pack or used in combination with the first battery pack to supply operational power to the electric vehicle.

In at least one embodiment of the invention, a method of extending driving range of an electric vehicle is provided, the electric vehicle including at least a first battery pack (e.g., non-metal-air battery pack) and a second battery pack (e.g., metal-air battery pack), the method including the steps of (i) determining the SOC of the first battery pack; (ii) comparing the current SOC of the first battery pack to a first preset minimum SOC to determine whether the first battery pack needs immediate charging or may be used to power the electric vehicle; and (iii) comparing the current SOC of the first battery pack to a second preset minimum SOC, wherein if the current SOC of the first battery pack is less than the second preset minimum SOC the second battery pack is used to charge the first battery pack. After charging of the first battery pack by the second battery pack has been initiated, for example due to the first battery pack requiring immediate charging, the method may further comprise the step of comparing the current SOC of the first battery pack to the first preset minimum SOC to determine when the SOC of the first battery pack has increased sufficiently to allow it to be used to supply power to the electric vehicle. After charging of the first battery pack by the second battery pack has been initiated, the method may further comprise the step of comparing the current SOC of the first battery pack to a preset maximum SOC to determine when the SOC of the first battery pack has increased sufficiently to allow charging to be terminated. Prior to charging the first battery pack with the second battery pack, the method may further comprise the step of comparing the current SOC of the second battery pack to a third preset minimum SOC, wherein use of the second battery pack to charge the first battery pack is only allowed if the current SOC of the second battery pack is greater than the third preset minimum SOC. The method may further comprise comparing the current SOCs of both the first and second battery packs to preset minimums to determine when vehicle operation must be terminated.

In at least one embodiment of the invention, a method of extending driving range of an electric vehicle is provided, the electric vehicle including at least a first battery pack (e.g., non-metal-air battery pack) and a second battery pack (e.g., metal-air battery pack), the method including the steps of providing means for selecting between a normal mode of operation and an extended range mode of operation, wherein when the extended range mode is selected vehicle operational power is provided by the first battery pack and the second battery pack is used to charge the first battery pack, and wherein when the normal mode is selected vehicle operational power is provided by the first battery pack and the second battery pack is not used. The means for selecting between modes may be integrated within the vehicle's user interface or navigation system. When the normal mode of operation is selected, the method may further include the steps of (i) determining the SOC of the first battery pack; and (ii) comparing the current SOC of the first battery pack to a first preset minimum SOC, wherein if the current SOC of the first battery pack is less than the first preset minimum SOC the second battery pack is used to charge the first battery pack. When the normal mode of operation is selected, the method may further include the steps of (i) determining the SOC of the first battery pack; (ii) comparing the current SOC of the first battery pack to a first preset minimum SOC to determine whether the first battery pack needs immediate charging; and (iii) comparing the current SOC of the first battery pack to a second preset minimum SOC, wherein if the current SOC of the first battery pack is less than the second preset minimum SOC the second battery pack is used to charge the first battery pack. Prior to charging the first battery pack with the second battery pack, the method may further comprise the step of comparing the current SOC of the second battery pack to a preset minimum SOC, wherein use of the second battery pack to charge the first battery pack is only allowed if the current SOC of the second battery pack is greater than the preset minimum SOC. The method may further comprise comparing the current SOCs of both the first and second battery packs to preset minimums to determine when vehicle operation must be terminated.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably. The term "battery pack" as used herein refers to one or more individual batteries that are electrically interconnected to achieve the desired voltage and capacity for a particular application, the individual batteries typically contained within a single piece or multi-piece housing. The terms "power system" and "battery system" may be used interchangeably and as used herein refer to an electrical energy storage system that has the capability to be charged and discharged such as a battery or battery pack. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
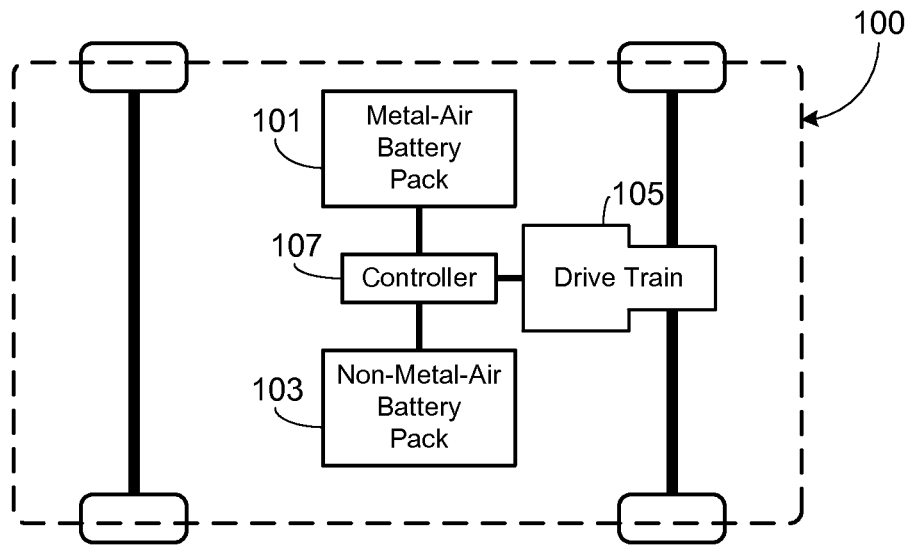
FIG. 1 illustrates the primary components of an electric vehicle that utilizes both a metal-air battery pack and a conventional battery pack.

Given the high energy density and the large capacity-to-weight ratio offered by metal-air cells, they are well suited for use in electric vehicles. Due to their limited power density, however, their use is most appropriate when combined with a more conventional power source, such as a lithium ion battery pack. This aspect is illustrated in FIG. 1 which shows the primary components of an EV 100 that utilizes both a metal-air battery pack 101 and a conventional, non-metal-air battery pack 103. As used herein, metal-air batteries refer to any cell that utilizes oxygen as one of the electrodes and metal (e.g., zinc, aluminum, magnesium, iron, lithium, vanadium, etc.) in the construction of the other electrode. Conventional battery pack 103 utilizes non-metal-air cells, and preferably ones that provide high power density, thus providing a combined power source that achieves an optimal combination of energy and power. Exemplary batteries used in conventional battery pack 103 include, but are not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, etc. In a preferred application, battery packs 101 and 103 are coupled to one or more drive motors 105 that provide propulsion to one or more wheels of EV 100. A controller 107 optimizes the vehicle's hybrid power source, i.e., battery packs 101 and 103, in light of the current battery pack conditions (e.g., state-of-charge, temperature, etc.), preferred battery pack charge/discharge conditions (e.g., state-of-charge, temperature range, etc.), and the various operating conditions. Exemplary operating conditions include those placed on the system by the user (e.g., speed, acceleration, etc.), road conditions (e.g., uphill, downhill, etc.), charging system (e.g., available power, available time for charging, etc.), and environmental conditions (e.g., ambient temperature, humidity, etc.).

Figure 2:
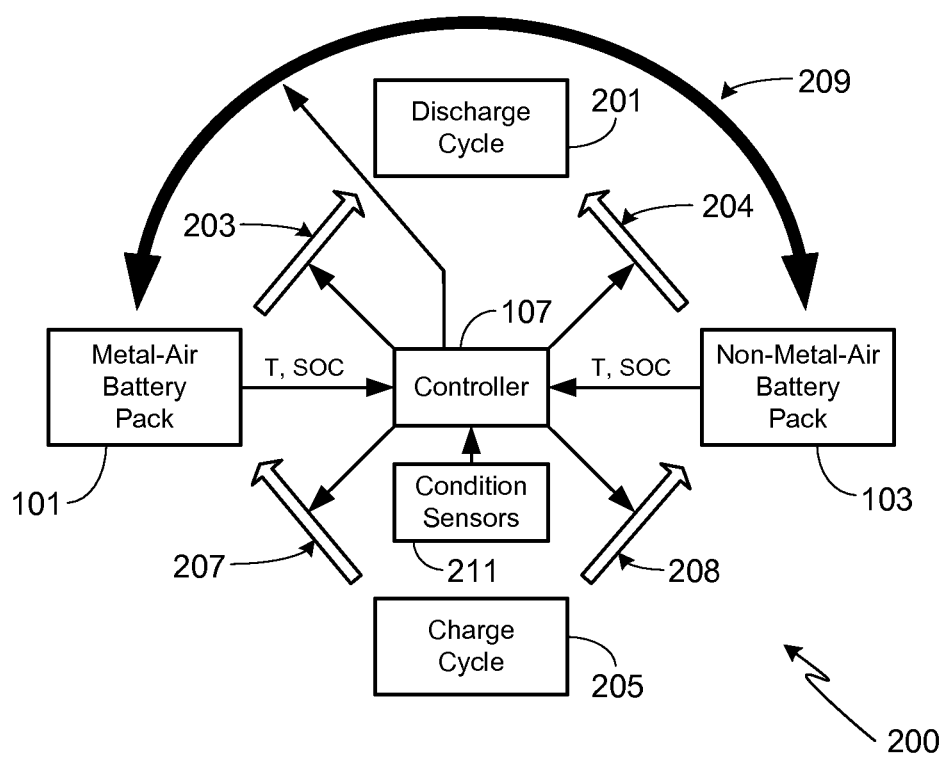
FIG. 2 illustrates the basic methodology of the invention.

FIG. 2 illustrates the basic methodology of the invention. As shown, during the discharge cycle 201 one or both battery packs 101 and 103 provide energy to the intended application (e.g., propulsion, cooling, auxiliary systems, etc.), the flow of energy represented by paths 203/204. Similarly, during the charging cycle 205 one or both battery packs 101 and 103 receive energy from a charging source, not shown, the flow of energy represented by paths 207/208. The charging source may be an external power source (e.g., power grid) or an internal power source (e.g., regenerative system). Lastly, in some embodiments energy may be transferred directly between battery packs 101 and 103 as represented by energy flow pathway 209.

In accordance with the invention, and as illustrated in system 200, controller 107 controls the flow of energy to and from both the metal-air battery pack 101 and the non-metal-air battery pack 103. As described in detail below, the methodology applied by controller 107 is based on the input from a variety of sensors 211 as well as the current operating conditions (e.g., temperature and state-of-charge (SOC), etc.) of both battery packs.

The primary advantage of using two different types of battery packs, and more specifically, a metal-air battery pack 101 and a conventional, non-metal-air battery pack 103, is that the operational characteristics of the two battery types are quite different. As a result, an EV utilizing both battery types can be designed to take advantage of the benefits of both battery types, while significantly limiting the negative effects of either type.

While the specific operating requirements and characteristics of the two battery packs will depend upon the particular chemistries of the cells selected for each battery pack, the basic differences between the two types are provided below, thus further clarifying how the present invention utilizes both battery types to optimize operation of the combined power source.

Energy Density—The energy density of the metal-air cells is very high, even relative to high density non-metal-air cells such as lithium-ion cells. In general, this is the result of the metal-air cells utilizing oxygen, contained within the air, as one of the reactants, thus reducing cell weight and increasing energy density. Accordingly, in weight sensitive applications such as EVs, metal-air cells offer a distinct advantage over non-metal-air cells in terms of energy density.

Power Density—The power density of a cell is determined by the cell's reaction kinetics. Currently the chemistries, materials and configurations used in metal-air cells provide a lower power density than that achieved by many non-metal-air cells. While the lower power density is adequate for many applications, it is lower than desired for more demanding applications. As a result, by combining both cell types in a single application as presently described, the high energy density, moderate power density metal-air cells can provide a baseline power source while the moderate energy density, high power density non-metal-air cells can provide the necessary power for peak loads, for example the loads that may be experienced during acceleration, high speed, and hill climbing. Clearly the relative sizes allocated for each battery type/pack within an EV depends upon the configuration and design of the vehicle (i.e., vehicle weight, performance goals, etc.).

Optimal Charge/Discharge Temperatures—Temperature affects many critical characteristics of battery operation regardless of the battery type/chemistry. Exemplary characteristics affected by temperature include cell voltage and discharge capacity, cell impedance, cell life, non-recoverable capacity loss (at high temperatures), and charging efficiency. While the preferred and optimal charge and discharge characteristics depend upon the particular cell design, chemistry, and reaction kinetics, in general metal-air cells may be charged and discharged at lower temperatures than non-metal-air cells without unduly affecting cell life and efficiency.

State-of-Charge (SOC)—The depth of discharge reached during the discharge cycle, and the level that a cell is charged (up to 100%) during the charge cycle, may dramatically affect the performance and life characteristics of a cell. These characteristics are dependent upon cell design and chemistry.

Recharge Characteristics—By definition a rechargeable battery is rechargeable, however, the number of times that a cell may be recharged without substantially affecting the capabilities and lifetime of the cell vary greatly with cell design and chemistry. In general, however, current state-of-the-art metal-air cells are not capable of being recharged as many times as a non-metal-air cell without causing a significant degradation in lifetime and capacity.

As noted above, the capabilities and lifetime of a rechargeable battery are both affected by the number of times that the cell is charged (i.e., charge cycles). Accordingly, in a preferred embodiment of the invention, the dual battery pack arrangement is used to reduce the number of times one, or both, battery packs are charged. As current metal-air batteries are more susceptible to the effects of repeated charge cycles, the present embodiment illustrates the use of the invention to minimize the charge cycles of the metal-air cells relative to the charge cycles of the non-metal-air cells. It should be understood, however, that the invention may also be used to minimize the charge cycles of the non-metal-air cells relative to the metal-air cells if, for example, at some point the non-metal-air cells become more susceptible to the effects of charging than the metal-air cells.

Figure 3:
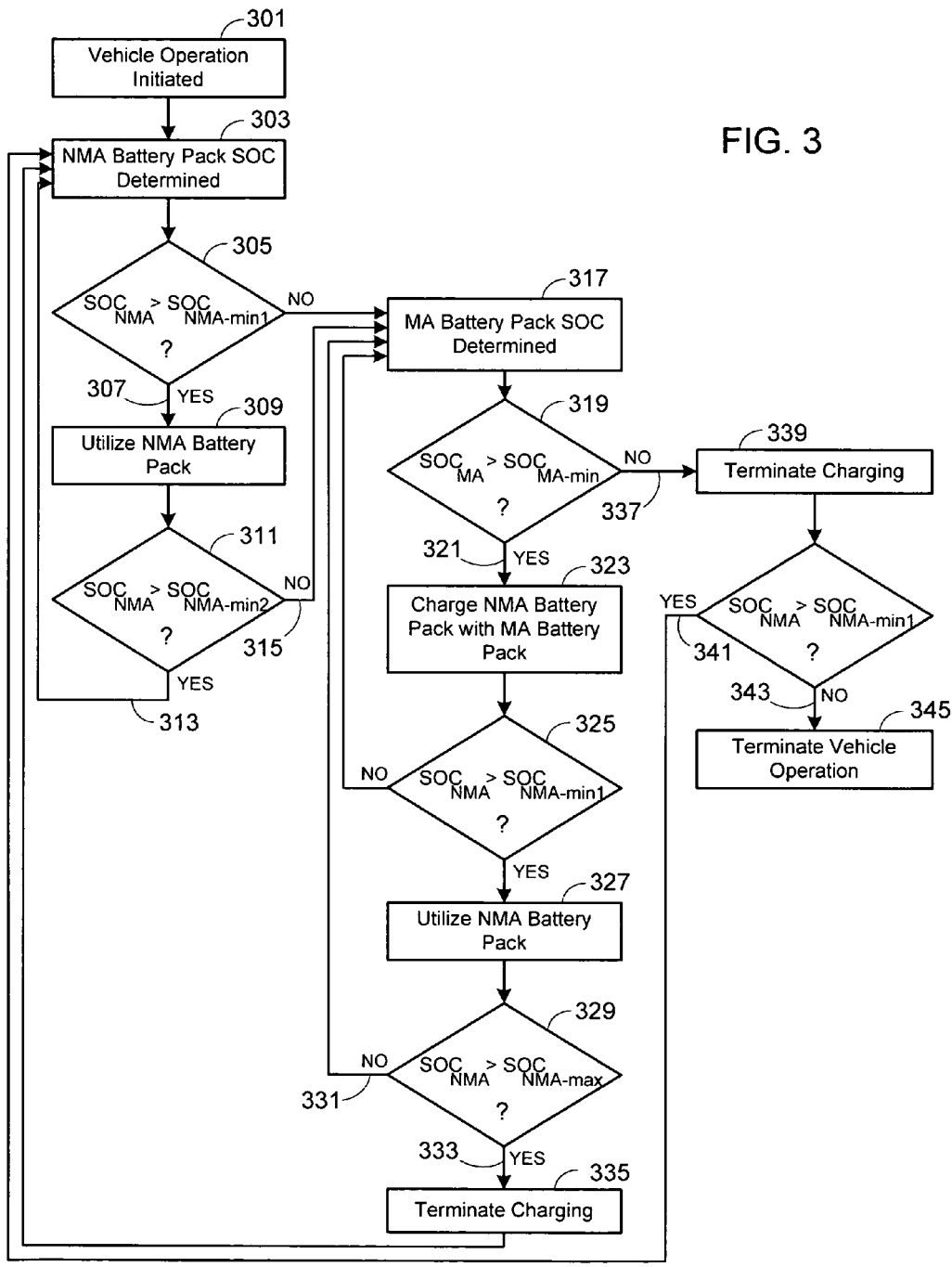
FIG. 3 illustrates the methodology of a preferred embodiment.

FIG. 3 illustrates a preferred embodiment of the invention utilizing a first battery pack comprised of non-metal-air cell(s) and a second battery pack comprised of metal-air cell(s). As shown, once vehicle operation is initiated (step 301), the state-of-charge (SOC) of non-metal-air battery pack 103 is determined (step 303). Note that in the figures "non-metal-air" is abbreviated as "NMA" and "metal-air" is abbreviated as "MA". Next, in step 305, it is determined whether or not the current SOC is greater than a first preset SOC minimum ($SOC_{NMA-Min1}$). Preferably the first preset SOC minimum is set at the absolute minimum SOC that the non-metal-air battery pack is allowed to reach. Typically this minimum is selected to prevent irreparable damage to the non-metal-air battery pack (e.g., 10% SOC, 5% SOC, 0% SOC or some other value). As long as the SOC of the non-metal-air pack is above this minimum (step 307), then the non-metal-air pack 103 is used to provide operational power to the vehicle (step 309), thus not draining the metal-air battery pack.

At step 311, the current SOC for the non-metal-air battery pack is compared to a second preset minimum SOC ($SOC_{NMA-Min2}$). Preferably the second preset minimum is not the minimum allowable SOC for the non-metal-air battery pack, rather the second preset minimum is set at a level to ensure that vehicle performance is not affected while providing sufficient time to take advantage of the vehicle having a second battery pack, i.e., metal-air battery pack 101. For example, in one embodiment the second preset minimum is set at 50% SOC; alternately, the preset minimum is set at 40% SOC; alternately, the preset minimum is set at 30% SOC; alternately, the preset minimum is set at 20% SOC. Other preset minimums may be used. If the current SOC is greater than the second preset (step 313), then the EV continues to utilize only the first battery pack, e.g., non-metal-air battery pack 103, to provide power to the drive system and the other vehicle subsystems.

During step 311, if controller 107 determines that the current SOC of battery pack 103 is not greater than the second preset minimum (step 315), then the current SOC of metal-air battery pack 101 is determined (step 317) and compared to a third preset minimum SOC, i.e., $SOC_{MA-Min}$ (step 319). Preferably the third preset minimum is set at the absolute minimum SOC that the metal-air battery pack is allowed to reach. Typically this minimum is selected to prevent irreparable damage to the metal-air battery pack (e.g., 10% SOC, 5% SOC, 0% SOC or some other value). As long as the SOC of the metal-air pack is above this minimum (step 321), then the metal-air battery pack is used to charge the non-metal-air battery pack 103 (step 323).

At step 325, the current SOC of the non-metal-air battery pack is once again compared to the first preset minimum SOC. As long as the current SOC is greater than the first preset minimum, the non-metal-air battery pack is used to supply operational power to the EV (step 327). If the non-metal-air battery pack was already being used to power the EV (e.g., via step 309), then in step 327 utilization of this battery pack continues.

Next the current SOC of the non-metal-air battery pack is compared to a preset maximum SOC (step 329). Preferably the preset maximum is not the maximum allowable SOC for the non-metal-air battery pack, rather the preset maximum is the value for the non-metal-air SOC at which charging from the metal-air pack is preferably terminated. For example, in one embodiment the preset maximum is set at 90% SOC; alternately, the preset maximum is set at 80% SOC; alternately, the preset maximum is set at 70% SOC; alternately, the preset maximum is set at 60% SOC. Other preset maximums may be used.

If controller 107 determines that the current SOC for the non-metal-air battery pack is less than the preset maximum (step 331), charging of the non-metal-air battery pack from the metal-air battery pack continues. If controller 107 determines that the current SOC for the non-metal-air battery pack is greater than the preset maximum (step 333), charging is terminated (step 335) and vehicle operation continues with only the first battery pack providing operational power to the vehicle.

At step 319, if the current SOC of the metal-air battery pack falls below the third preset minimum SOC, i.e., $SOC_{MA-Min}$ (step 337), charging is terminated (step 339). Even with the SOC of the metal-air battery pack falling below the third preset minimum SOC, operation of the vehicle may continue as long as the SOC of the non-metal-air battery pack remains greater than the first preset minimum SOC (step 341). If the SOC of the non-metal-air battery pack falls below the first preset minimum SOC (step 343), then vehicle operation must be terminated (step 345). It will be understood that the termination of vehicle operation will follow a predefined procedure that may, for example, include low power warnings, gradual reduction in power (e.g., decreased acceleration and top speed), shut-down of non-essential vehicle systems (e.g., radio and interior lighting) prior to shutting down essential vehicle systems, etc.

In the embodiment described above and illustrated in FIG. 3, the second battery pack (e.g., the metal-air battery pack) is used to charge the first battery pack (e.g., the non-metal-air battery pack) when the SOC of the first battery pack falls below a preset value. In an alternate embodiment illustrated in FIG. 4, when the SOC of the first battery pack falls below the preset minimum (step 315), the second battery pack (e.g., metal-air battery pack 101) is used to augment the output from the non-metal-air battery pack (step 401), assuming that the SOC of the metal-air battery pack is greater than the preset minimum SOC as determined in step 319. By augmenting the output from the first battery pack, less drain is placed on it, thereby extending how long the first battery pack may be used prior to reaching its minimum acceptable SOC. At the same time, as the second pack (e.g., metal-air battery pack 103) is only used when the SOC of the first battery pack falls below a preset minimum, the second pack is protected from undergoing unnecessary charge cycles.

Figure 4:
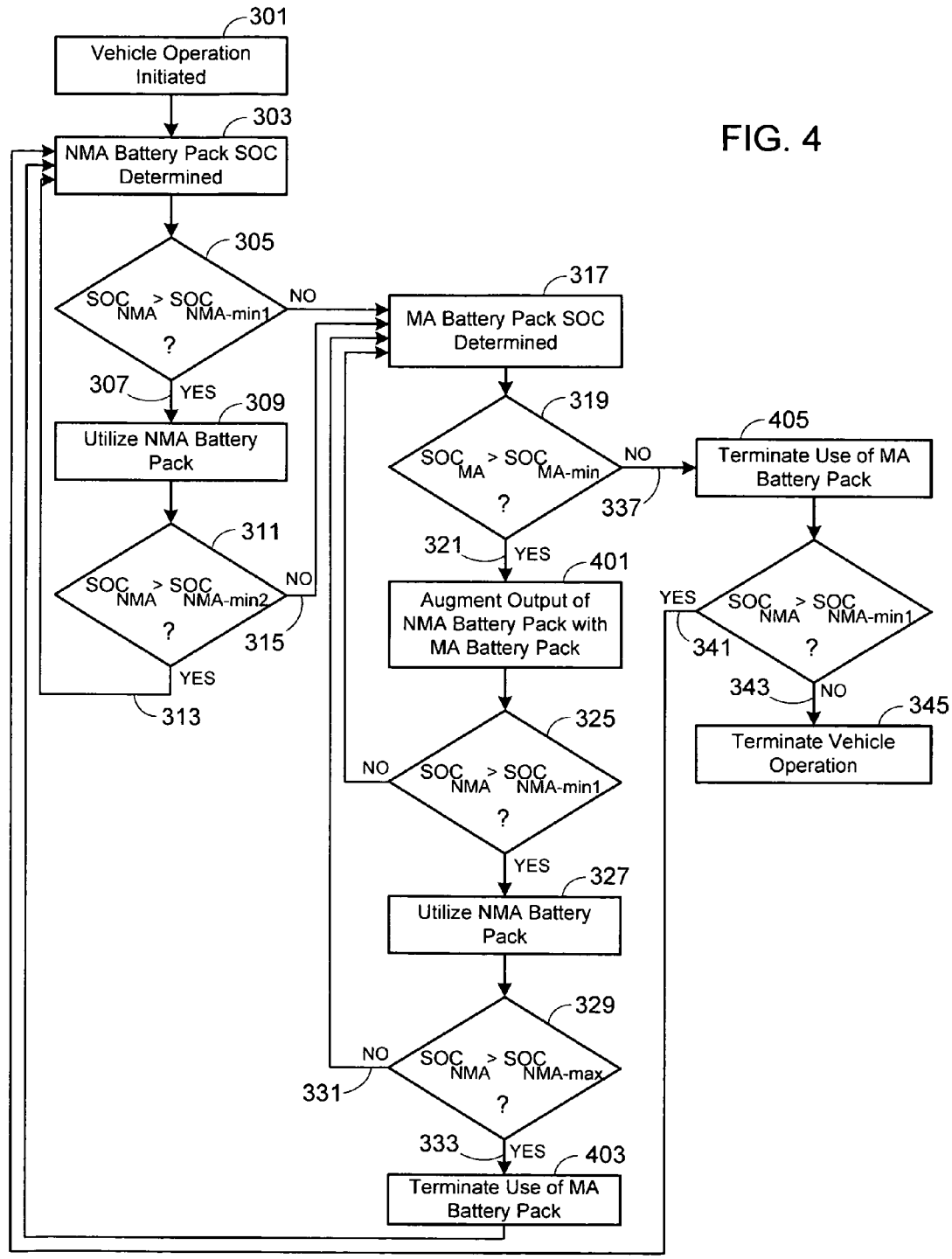
FIG. 4 illustrates the methodology of an alternate embodiment.

In the embodiment illustrated in FIG. 4, once the current SOC of the non-metal-air battery pack exceeds the preset maximum (step 333) or when the current SOC of the metal-air battery pack falls below the third preset minimum (step 337), use of the metal-air battery pack to augment the output of the non-metal-air battery pack is terminated as illustrated in steps 403 and 405, respectively.

Figure 5:
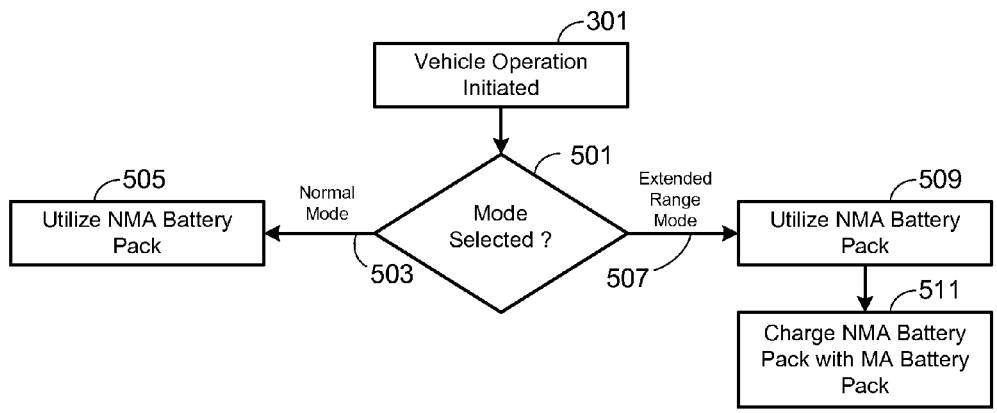
FIG. 5 illustrates a modification of the methodology of FIG. 3.
Figure 6:
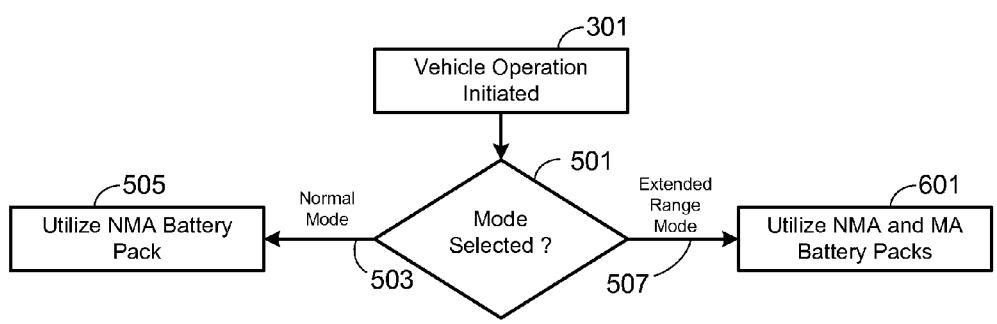
FIG. 6 illustrates a modification of the methodology of FIG. 4.

In the embodiments illustrated in FIGS. 3 and 4 and described above, the second battery pack, typically the metal-air battery pack, is only used when the SOC of the first battery pack, typically the non-metal-air battery pack, falls below a preset SOC value. As a result, the second battery pack, typically the metal-air battery pack, is spared from unnecessary charge cycles. FIGS. 5 and 6 illustrate modifications of the embodiments illustrated in FIGS. 3 and 4, respectively, in which whether or not the second battery pack is used depends upon a selection made by the user (e.g., driver). More specifically, vehicle 100 includes means for selecting a particular mode of operation, accessible by the user, which allows the user to select between at least two modes of operation; a normal range mode and an extended range mode. The mode selector is integrated into the vehicle's user interface, for example using a touch-sensitive screen or some form of switch (e.g., toggle switch, push button switch, slide switch, rotating selector switch, etc.). Alternately, the mode selection may be made in response to a selection made by the user, for example, by the user setting a destination in the navigation system that falls outside of the vehicle's normal driving range, but within the vehicle's extended driving range. Accordingly, it will be appreciated that the invention is not limited to a specific means of selecting the operational mode of the vehicle.

As shown in FIG. 5, once vehicle operation is initiated (step 301) the system determines whether or not the extended range mode has been selected (step 501). As previously noted, the extended range mode may be made using a mode selector or in response to another selection made by the driver (e.g., destination entered into the navigation system). If the extended range has not been selected (step 503), then the first battery pack is used to supply all operational power to the vehicle, thereby sparing the second battery pack from unnecessary use, and therefore unnecessary charging cycles. Based on the current state-of-the-art, the first battery pack is a conventional (i.e., non-metal-air) battery pack and the second battery pack is a metal-air battery pack. This choice is based on the achievable power density for each type of cell, as well as the demonstrated sensitivity of each cell type to repeated charge/discharge cycles.

If the normal range is selected, either via active selection or by default, then the non-metal-air battery pack 103 is used to supply power for all of the operational needs of the vehicle (step 505). If the extended range is selected (step 507), then the non-metal-air battery pack is used to supply power to the vehicle (step 509) and the metal-air battery pack is used to charge the non-metal-air battery pack (step 511), thereby maintaining the non-metal-air battery pack within a preferred SOC range and extending its capabilities, and thus the vehicle's range. Alternately, and as illustrated in FIG. 6 and described above relative to FIG. 4, when the extended range is selected (step 507) the metal-air battery pack is used to augment the output of the non-metal-air battery pack (step 601), thereby extending the vehicle's range.

Figure 7:
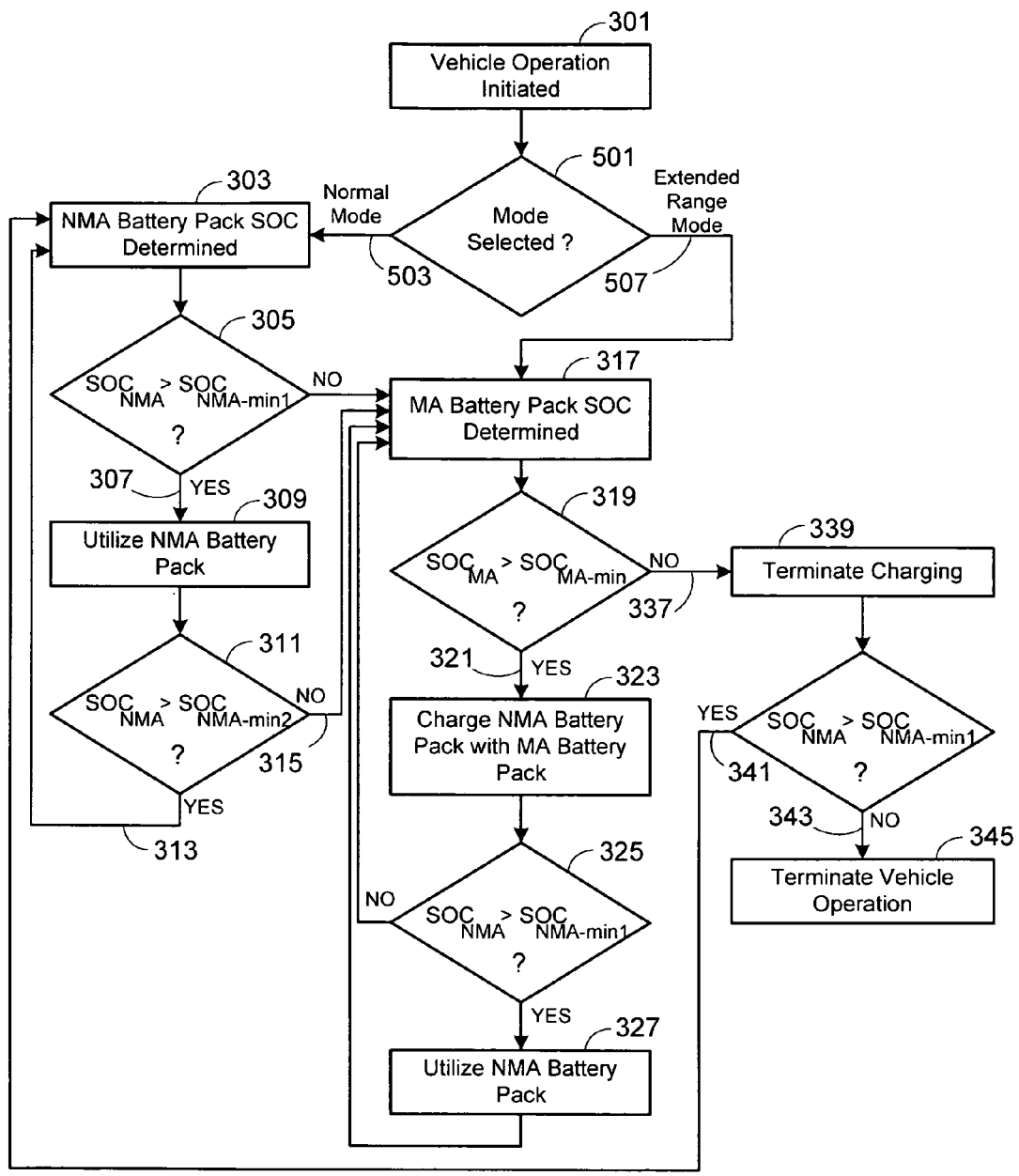
FIG. 7 illustrates a methodology based on the processes shown in FIGS. 3 and 5.
Figure 8:
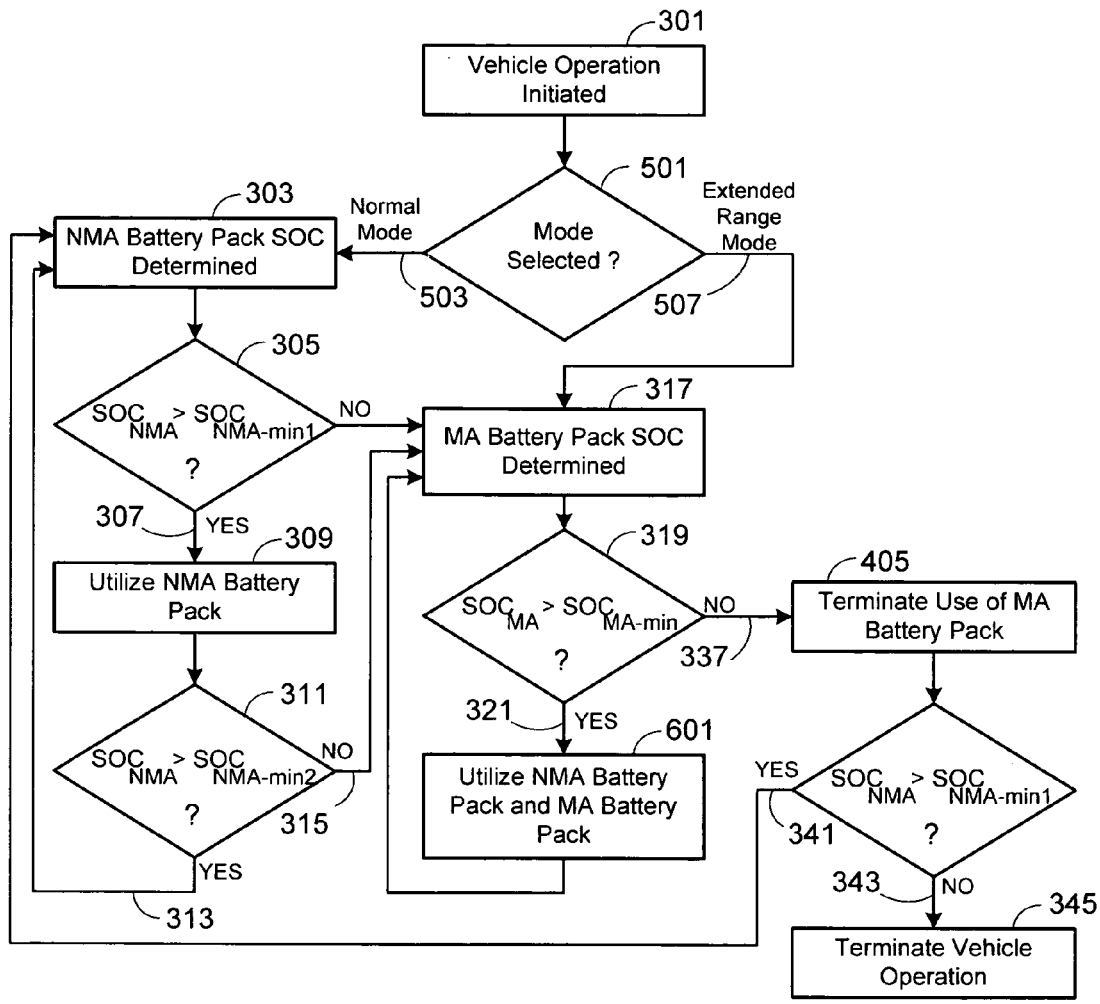
FIG. 8 illustrates a methodology based on the processes shown in FIGS. 4 and 6.

In an alternate embodiment, the ability to select a particular operational mode (e.g., normal versus extended range) is combined with the ability for the system to react to the SOC of the first battery pack falling below a preset minimum. This combination of features allows the user to pre-select an operational mode, and for the system to alter operation based on the user's actual needs. Thus, for example, if a user selects the normal operating mode based on the expected driving range, but then unexpectedly exceeds the normal range, the system automatically extends the driving range utilizing the second power source. FIG. 7 illustrates a preferred embodiment of this configuration, the illustrated system including the attributes of the processes shown in FIGS. 3 and 5. Similarly, the system illustrated in FIG. 8 combines the attributes of the processes shown in FIGS. 4 and 6.

It will be appreciated that while the illustrated embodiments are preferred, a variety of minor variations are envisioned that are clearly within the scope of the invention. For example, the process illustrated in FIG. 8 assumes that the capacity of the first battery pack, i.e., the non-metal-air battery pack, is larger than that of the second battery pack, i.e., the metal-air battery pack. As a result, in this embodiment the SOC of the metal-air battery pack is expected to fall below its minimum allowable SOC before the non-metal-air battery pack falls below its minimum allowable SOC. Clearly the invention is not limited to this configuration.

Additionally, while both the metal-air battery pack 101 and the non-metal-air battery pack 103 are shown and described as singular packs, it should be understood that one or both of these packs may be comprised of multiple modules, and that the present invention is equally applicable to such a configuration. The use of multiple modules (or mini-battery packs) may be useful in distributing weight throughout EV 100, or to fit into the physical constraints of the EV's chassis/body, and does not impact the present invention.

As will be understood by those familiar with the art, the present invention may be embodied in other specific forms without departing from the spirit or essential characteristics thereof. For example, while the illustrated embodiments assume the use of a non-metal-air battery pack as the first battery pack and a metal-air battery pack as the second battery pack, these battery types may be reversed, thus using the metal-air battery pack as the first battery pack and the non-metal-air battery pack as the second battery pack. Accordingly, the disclosures and descriptions herein are intended to be illustrative, but not limiting, of the scope of the invention which is set forth in the following claims.

What is claimed is:

1. A method of extending driving range of an electric vehicle, the electric vehicle including at least a first battery pack and a second battery pack, wherein the first and second battery packs are comprised of different battery types, the method comprising the steps of:
   a) determining a current state-of-charge (SOC) of the first battery pack;
   b) comparing said current SOC of the first battery pack with a first preset minimum SOC, wherein if said current SOC of the first battery pack is less than said first preset minimum SOC said method skips to step d), and wherein if said current SOC of the first battery pack is greater than said first preset minimum SOC, vehicle operational power is supplied to the electric vehicle from the first battery pack;
   c) comparing said current SOC of the first battery pack with a second preset minimum SOC, wherein said second preset minimum SOC is greater than said first preset minimum SOC, wherein if said current SOC of the first battery pack is greater than said second preset minimum SOC said method returns to step a), and wherein if said current SOC of the first battery pack is less than said second preset minimum SOC said method further comprises the step of:
   d) charging the first battery pack from the second battery pack.

2. The method of claim 1, wherein after step d) said method further comprises the steps of:
   e) comparing said current SOC of the first battery pack with said first preset minimum SOC, wherein if said current SOC of the first battery pack is less than said first preset minimum SOC said method returns to step d), and wherein if said current SOC of the first battery pack is greater than said first preset minimum SOC, vehicle operational power is supplied to the electric vehicle from the first battery pack.

3. The method of claim 2, wherein after step e) said method further comprises the steps of:
   f) comparing said current SOC of the first battery pack with a preset maximum SOC, wherein if said current SOC of the first battery pack is less than said preset maximum SOC said method returns to step d), and wherein if said current SOC of the first battery pack is greater than said preset maximum SOC, first battery pack charging is terminated and said method returns to step a).

4. The method of claim 1, wherein after step d) said method further comprises the steps of:
   e) comparing said current SOC of the first battery pack with a preset maximum SOC, wherein if said current SOC of the first battery pack is less than said preset maximum SOC said method returns to step d), and wherein if said current SOC of the first battery pack is greater than said preset maximum SOC, first battery pack charging is terminated and said method returns to step a).

5. The method of claim 1, wherein prior to step d) said method further comprises the steps of:
   c2) determining a current SOC of the second battery pack;
   c3) comparing said current SOC of the second battery pack with a third preset minimum SOC, wherein if said current SOC of the second battery pack is greater than said third preset minimum SOC said method continues to step d), and wherein if said current SOC of the second battery pack is less than said third preset minimum SOC said method further comprises the steps of:
      i) comparing said current SOC of the first battery pack with said first preset minimum SOC, wherein if said current SOC of the first battery pack is greater than said first preset minimum SOC said method returns to step a), and wherein if said current SOC of the first battery pack is less than said first preset minimum SOC said method further comprises the step of terminating vehicle operation.

6. The method of claim 5, wherein in step b) if said current SOC of the first battery pack is less than said first preset minimum SOC said method skips to step c2), and wherein in step c) if said current SOC of the first battery pack is less than said second preset minimum SOC said method skips to step c2).

7. The method of claim 5, wherein after step d) said method further comprises the steps of:
   e) comparing said current SOC of said first battery pack with said first preset minimum SOC, wherein if said current SOC of said first battery pack is less than said first preset minimum SOC said method returns to step c2), and wherein if said current SOC of said first battery pack is greater than said first preset minimum SOC, vehicle operational power is supplied from said first battery pack to said electric vehicle.

8. The method of claim 7, wherein after step e) said method further comprises the steps of:
   f) comparing said current SOC of the first battery pack with a preset maximum SOC, wherein if said current SOC of the first battery pack is less than said preset maximum SOC said method returns to step c2), and wherein if said current SOC of the first battery pack is greater than said preset maximum SOC, first battery pack charging is terminated and said method returns to step a).

9. The method of claim 5, wherein after step d) said method further comprises the steps of:
   e) comparing said current SOC of the first battery pack with a preset maximum SOC, wherein if said current SOC of the first battery pack is less than said preset maximum SOC said method returns to step c2), and wherein if said current SOC of the first battery pack is greater than said preset maximum SOC, first battery pack charging is terminated and said method returns to step a).

10. The method of claim 1, wherein said first battery pack is comprised of a plurality of non-metal-air cells and said second battery pack is comprised of a plurality of metal-air cells.

* * * * *